US007289066B2

(12) United States Patent
Homölle et al.

(10) Patent No.: US 7,289,066 B2
(45) Date of Patent: Oct. 30, 2007

(54) FILM HAVING AN IMPRINTED ANTENNA

(75) Inventors: Dieter Homölle, Ochtrup (DE);
Michael Kohla, Havixbeck (DE)

(73) Assignee: Nordenia Deutschland Gronau GmbH, Gronau (DE)

(*) Notice: Subject to any disclaimer, the term of this patent is extended or adjusted under 35 U.S.C. 154(b) by 15 days.

(21) Appl. No.: 11/342,063

(22) Filed: Jan. 27, 2006

(65) Prior Publication Data
US 2006/0176236 A1 Aug. 10, 2006

(30) Foreign Application Priority Data
Jan. 28, 2005 (EP) .................................. 05001864

(51) Int. Cl.
*H01Q 1/38* (2006.01)
(52) U.S. Cl. .............................. 343/700 MS; 343/795; 343/866
(58) Field of Classification Search ................ 343/795, 343/700 MS, 801, 702, 866
See application file for complete search history.

(56) References Cited

U.S. PATENT DOCUMENTS

| 4,987,424 | A | * | 1/1991 | Tamura et al. .............. 343/795 |
| 6,344,792 | B1 | * | 2/2002 | Tuttle et al. ............. 340/10.42 |
| 6,608,599 | B2 | * | 8/2003 | Chen et al. ................. 343/795 |
| 2002/0003496 | A1 | | 1/2002 | Brady et al. |
| 2003/0080903 | A1 | | 5/2003 | Chen et al. |
| 2004/0125040 | A1 | * | 7/2004 | Ferguson et al. ........... 343/895 |
| 2004/0129788 | A1 | * | 7/2004 | Takahashi et al. .......... 235/492 |
| 2004/0159257 | A1 | * | 8/2004 | Mathieu ..................... 101/491 |

FOREIGN PATENT DOCUMENTS

WO  WO 03/068874  8/2003

* cited by examiner

*Primary Examiner*—Hoang V. Nguyen
(74) *Attorney, Agent, or Firm*—Collard & Roe, P.C.

(57) ABSTRACT

A film having an imprinted antenna, for use with an RFID chip. The antenna consists of a conductor track provided with connector ends. According to the invention, the antenna, applied in a printing method, with a conductive printing ink, has window-like recesses in the conductor track, whereby the area of the recesses amounts to at least 20% of the total area having the recesses.

12 Claims, 4 Drawing Sheets

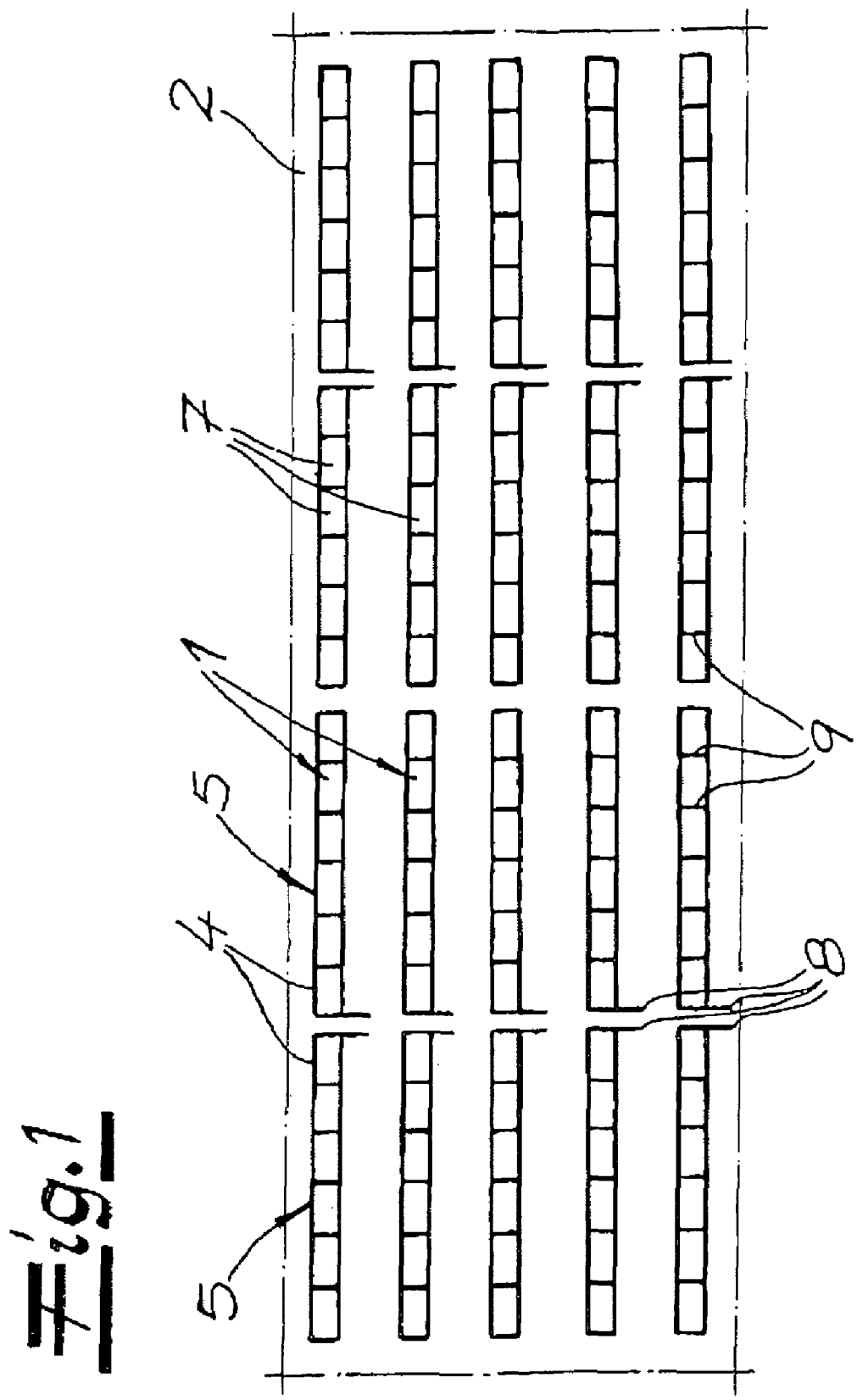

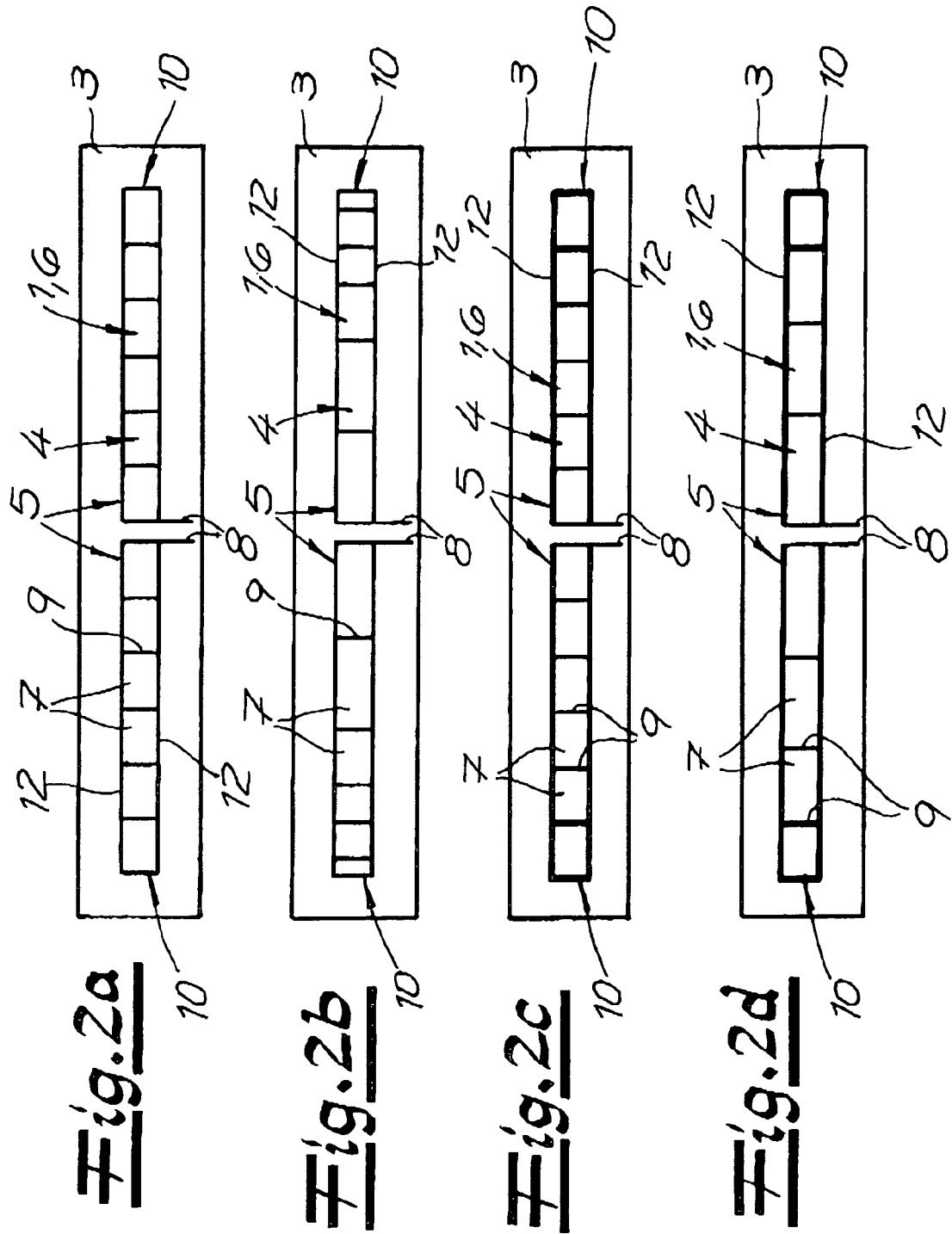

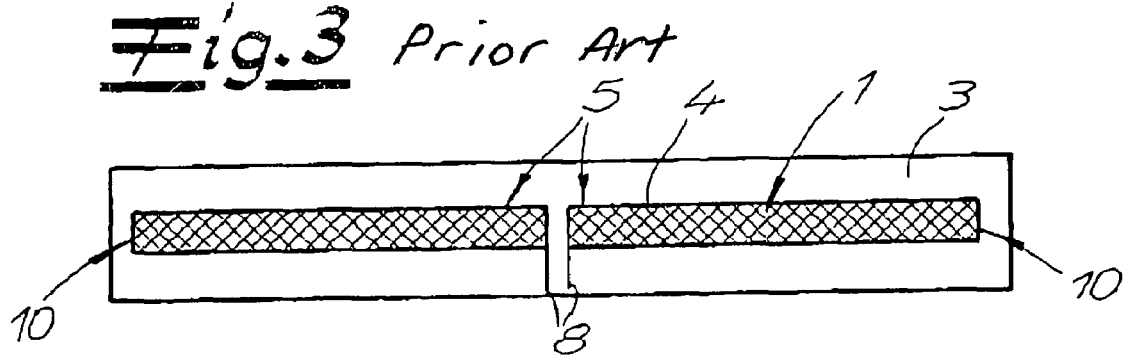
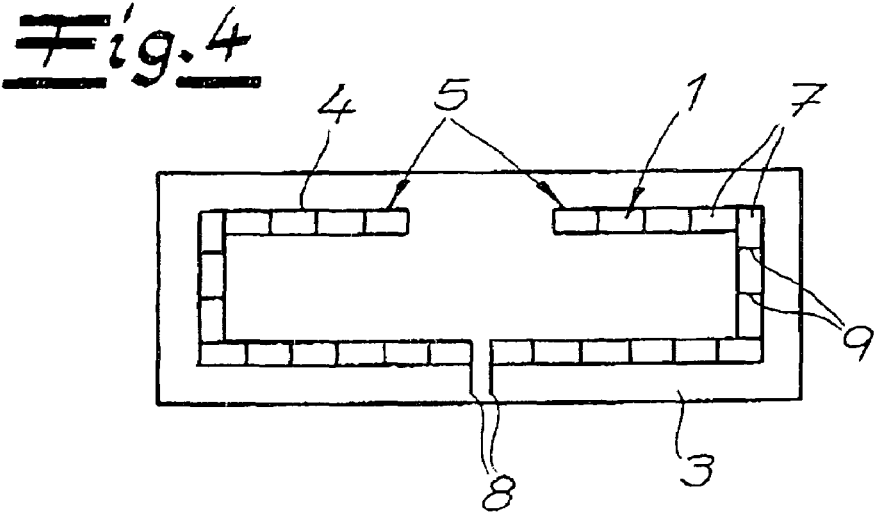

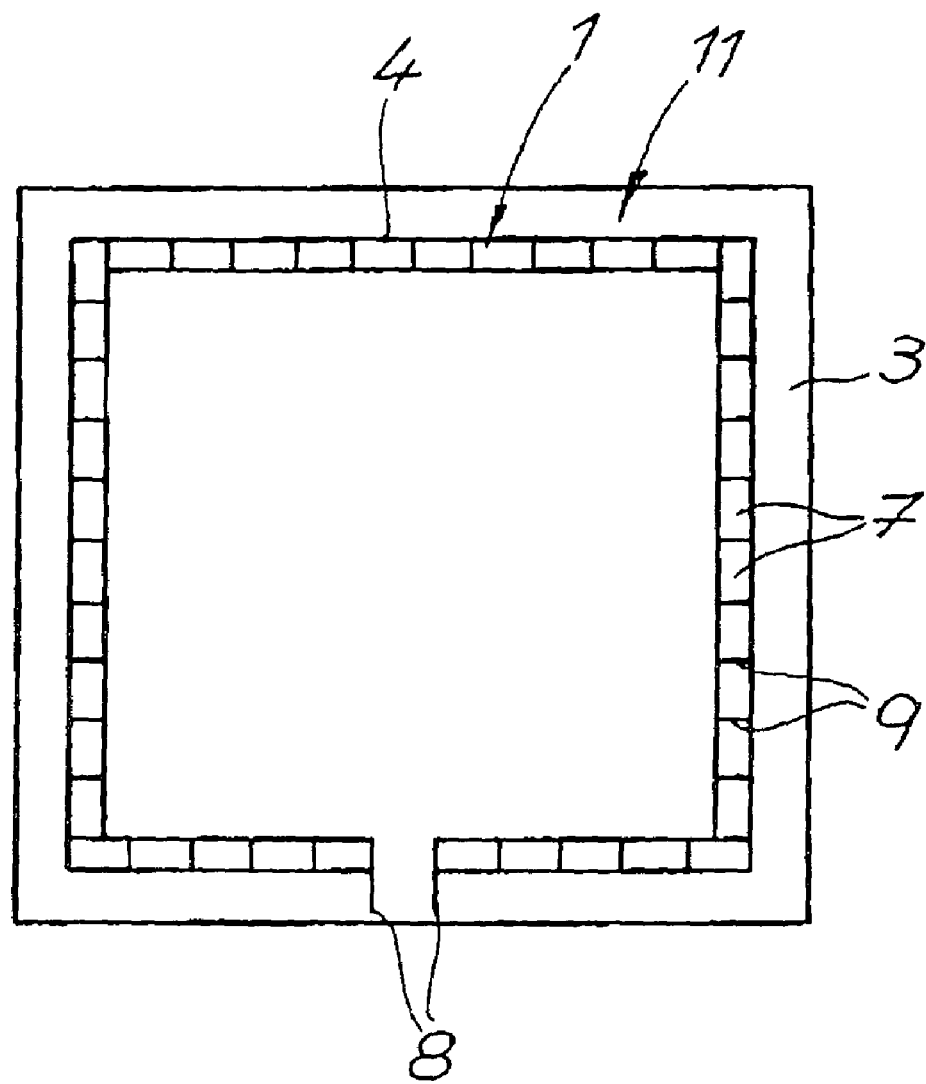

FILM HAVING AN IMPRINTED ANTENNA

BACKGROUND OF THE INVENTION

1. Field of the Invention

The invention relates to a film having an imprinted antenna, for use with an RFID chip. The antenna consists of a conductor track with connector ends.

2. The Prior Art

RFID (radio frequency identification) chips are active or passive circuits that can be read out with a reader device, in contact-free manner, and are suitable for goods identification. A label film having an imprinted half-wave dipole antenna is known from International Application Publication No. WO 03/068874 A1. In this connection, antennas having full-surface conductor tracks are imprinted on the label film. The antennas are formed from a conductor track having two conductor track pieces.

United States Patent Application Publication No. 2003/080903 A1 relates to a dipole antenna in which a plurality of symmetrically shaped conductive structures that are spaced apart from one another are applied to a dielectric carrier plate. Between the structures that are spaced apart, there are additional coupling structures that are applied separately. This antenna is used for headsets of mobile telephones and allows a reduction of the construction size as compared to a usual half-wave dipole antenna, in which the length of the conductor track pieces correlates directly with the wavelength.

A tunable antenna on a flexible substrate for the high-frequency range is known from US Patent Application Publication No. 2002/0003496 A1. The antenna has full-surface conductor tracks and additional, separable conductor structures for tuning the antenna. Compared with an antenna designed for a fixed frequency, having conductor tracks that extend proceeding from connector ends, the production of the additional structures requires many times the amount of conductive antenna material.

SUMMARY OF THE INVENTION

It is therefore the object of the invention to reduce the costs and the expenditure of conductive printing ink for series production of a film having an imprinted antenna. It is another object of the invention to provide an antenna having good functional properties, specifically broad bandwidth, great reflux damping, and low transmission damping.

This object is accomplished according to the invention in that the antenna, applied in a printing method, with a conductive printing ink, has window-like recesses in the conductor track. The area of the recesses amounts to at least 20% of the total area of the conductor track having the recesses. The reference variable for the area ratio is the total area of the conductor track including its recesses. It is practical if the window-like recesses are disposed so that they are essentially uniformly distributed over the entire length of the conductor track, all the way to the connector ends. Preferably, in a top view, the conductor track has a grid structure, which consists of two longitudinal traces that run in the longitudinal direction of the conductor track, and a plurality of crosspieces that connect the longitudinal traces. The grid structure extends over the entire length of the conductor track, all the way to the connector ends. Because of the recesses, the material expenditure of the expensive printing ink can be significantly reduced, without affecting the broadband radiation properties of the antenna, compared with an antenna having a full-area conductor track. Broadband properties, in this connection, are understood to be the transmission properties of the antenna above and below the central resonance frequency of the antenna.

In order to be able to use the antenna that is applied to the film, e.g. a label film or a packaging film, in a varied and flexible manner when it is used with an RFID chip, a broadband value of 100 MHz is aimed at in the UHF range between 800 and 1000 MHz or in the SHF range between 2.4 and 2.6 GHz. The antenna preferably has a bandwidth of more than 100 MHz, based on a reduction of the reflux attenuation in the resonance range of up to −10 dB. The resonance frequency of the antennas results from their geometry and dimensions. Thus, in the case of a half-wave dipole antenna, the length of the conductor track pieces correlates directly with the wavelength.

Fundamentally, different printing methods can be used for imprinting the antennas. The gravure printing method, using conductive printing ink, has proven to be particularly suitable for series production of the film. In this connection, antennas are imprinted on a film web using a printing ink that contains a conductive material. In this connection, the imprinting of the total conductor track of an antenna takes place in one method step. Possible film materials are polymer film material, preferably from among the group of polyesters, polyamides, and polyolefins. These include, for example, polyethylene terephthalate, polybutylene terephthalate, polypropylene, polyethylene, modified or crosslinked polyethylenes, polystyrene, and mixtures or copolymerizates of these polymers. The films can also be coextruded in multiple layers, or laminated.

The film web has a layer thickness between 30 and 150 µm, for example. It can be brought into commerce as rolled goods. Film sections having one antenna in each section, can be cut off from the film web.

In addition to the high film web speeds of 50 m/min and more, the gravure method particularly allows precise dimensioning of the layer thickness of the conductor tracks that are applied. When printing small structures, the gravure method, as compared with the screen-printing method, for example, has a good edge sharpness and low peak-to-valley height, which is less than 5 µm Thus, it is possible to produce conductor tracks having a layer thickness below 10 µm, and tolerances of less than ±1 µm can be adhered to for all antennas applied to a film web. The imprinted conductor tracks have recesses having any desired irregular, in particular fractal, or regular, preferably round, ellipsoid, or rectangular, shapes. By reducing the imprinted area, as compared with a full-area antenna having the same outer dimensions, the amount of printing ink used can be reduced, thereby clearly reducing the production costs. It is practical if the area of the recesses amounts to more than 20%, preferably at least 50%, with reference to the total area of the conductor track including its recesses.

By varying the width of the recesses and the thickness of the crosspieces between the recesses, the properties of the antenna, such as the resonance frequency, for example, can be changed in a targeted manner.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a detail from a label film web having antennas applied using the gravure printing method;

FIGS. 2a-2d show various embodiments of a half-wave dipole antenna according to the invention;

FIG. 3 shows a half-wave dipole antenna according to the state of the art;

FIG. 4 shows an antenna having angled conductor track pieces; and

FIG. 5 shows an antenna loop.

DETAILED DESCRIPTION OF THE PREFERRED EMBODIMENT

Referring now in detail to the drawings, FIG. 1 shows a detail of a film web 2 imprinted with antennas 1, from which a plurality of films 3, which are used as labels, having one antenna 1, in each instance, can be punched out. Film web 2 preferably consists of polyethylene terephthalate (PET) and has a thickness between 30 and 150 µm, for example. These antennas 1 are intended for use with RFID chips and designed for coupling in the UHF range between 800 and 1000 MHz or in the SHF range between 2.4 and 2.6 GHz. Their conductor track 4 is divided into two conductor track pieces 5 and forms a half-wave dipole antenna 6. Antenna 1 is imprinted onto film web 2 using the rotation printing method, using a conductive printing ink, and contains window-like recesses 7. Recesses 7 form cells within the conductor track pieces 5, which are rectangular in a top view, and have an area, in total, that is at least 20%, preferably at least 50%, with reference to the outer dimensions of antenna 1. The printing ink applied to film web 2 contains a conductive material.

The window-like recesses are essentially uniformly distributed over the entire length of the conductor tracks, all the way to the connector ends. In the exemplary embodiments that represent a preferred embodiment, conductor track 4 has a grid structure in a top view, which consists of two longitudinal traces 12 that run in the longitudinal direction of the conductor track, and a plurality of crosspieces 9 that connect longitudinal traces 12. It is evident from the figures that the grid structure extends over the entire length of conductor track 4, all the way to connector ends 8.

FIG. 2a shows a film 3 that is used as a label, with an imprinted half-wave dipole antenna 6. Half-wave dipole antenna 6 has two conductor track pieces 5 that are rectangular in a top view, which extend to the left and the right, respectively, from a connector end 8 for an RFID chip that is disposed in the center. Conductor track pieces 5 contain recesses 7 that are configured as rectangular windows. In the embodiment of FIG. 2a, all of the recesses 7 in conductor track pieces 5 are configured to be of a uniform size. Crosspieces 9 between recesses 7 are part of conductor track pieces 5 and possess the same crosspiece width in this embodiment.

In the embodiment shown in FIG. 2b, the dimensions of recesses 7 in imprinted conductor track pieces 5 decrease in the direction of antenna ends 10.

In the embodiment of FIG. 2c, the crosspiece width of crosspieces 9 provided between recesses 7 changes. The crosspiece width of these crosspieces becomes greater in the direction of antenna ends 10.

In the embodiment of FIG. 2d, the measures described using FIG. 2b and 2c have been combined with one another.

The half-wave dipole antennas 6 according to the invention, presented in FIG. 2a to 2d, allow a clear reduction in the printing ink required as compared with the corresponding state of the art shown in FIG. 3, and thereby allow a more cost-advantageous production of films 3 that are intended for use with an RFID chip, with an imprinted antenna 1.

FIG. 4 shows an antenna 1 having angled conductor track pieces. By means of this arrangement, the total length of antenna 1 can be reduced, while the antenna frequency remains the same.

FIG. 5 shows an antenna structure according to the invention, in which the conductor track forms an antenna loop 11. An antenna 1 in this embodiment is also referred to as a quad-loop or whole-wave loop, on the basis of its geometry. It has very good reception performance. Window-like recesses 11 disposed in the conductor track can have any desired regular or irregular shape, and are preferably round, ellipsoid, or rectangular. In this embodiment, all the recesses 7 have essentially the same dimensions, and crosspieces 9 have the same crosspiece width. However, recesses 7 can have different sizes, and/or the crosspieces 9 can have different crosspiece widths.

The antennas according to the invention are characterized by a great bandwidth, great reflux damping, as well as low transmission damping. Surprisingly, the recesses in the conductor track, which typically has edges that run straight, and a width that remains uniform along its progression, cause practically no significant transmission losses.

Accordingly, while only a few embodiments of the present invention have been shown and described, it is obvious that many changes and modifications may be made thereunto without departing from the spirit and scope of the invention.

What is claimed is:

1. A film having an imprinted antenna, for use with an RFID chip, the antenna comprising a conductor track having connector ends, wherein the antenna has window-like recesses uniformly distributed over an entire length of the conductor track all the way to the connector ends, and wherein an area of the recesses amounts to at least 20% of a total area of the conductor track having the recesses.

2. A film according to claim 1, wherein the conductor track has a grid structure, in a top view, which consists of two longitudinal traces that run in a longitudinal direction of the conductor track, and a plurality of crosspieces that connect the longitudinal traces, wherein the grid structure extends over an entire length of the conductor track, all the way to the connector ends.

3. A film according to claim 1, wherein the antenna is designed for excitation in the UHF range between 800 and 1000 MHz or in the SHF range between 2.4 and 2.6 GHz.

4. A film according to claim 1, wherein the recesses in the conductor track are round, ellipsoid, or rectangular.

5. A film according to claim 1, wherein the conductor track of the antenna consists of two conductor track pieces disposed with axial symmetry, and wherein the conductor track forms a half-wave dipole antenna.

6. A film according to claim 5, wherein the conductor track pieces run straight, bent, or angled in a direction of the antenna ends.

7. A film according to claim 1, wherein the conductor track forms an antenna loop.

8. A film according to claim 1, wherein the film comprises polymer carrier films, multi-layer coextruded films, or laminates are used as the film material.

9. A film according to claim 1, wherein the antenna is imprinted onto the film using a gravure printing method.

10. A film having an imprinted antenna, for use with an RFID chip, the antenna comprising a conductor track having connector ends, wherein the antenna has window-like recesses in the conductor track and wherein an area of the recesses amounts to at least 20% of a total area of the conductor track having the recesses, and wherein the antenna has a bandwidth of at least 100 MHz, based on a reduction of reflux attenuation in a resonance range of up to −10 dB.

11. A film having an imprinted antenna, for use with an RFID chip, the antenna comprising a conductor track having connector ends, wherein the antenna has window-like recesses in the conductor track and wherein an area of the recesses amounts to at least 20% of a total area of the conductor track having the recesses, wherein the conductor track of the antenna consists of two conductor track pieces disposed with axial symmetry, wherein the conductor track forms a half-wave dipole antenna and wherein the dimensions of the recesses in the conductor track pieces decrease in the direction of the antenna ends.

12. A film having an imprinted antenna, for use with an RFID chip, the antenna comprising a conductor track having connector ends, wherein the antenna has window-like recesses in the conductor track and wherein an area of the recesses amounts to at least 20% of a total area of the conductor track having the recesses, wherein the conductor track has a grid structure, in a top view, which consists of two longitudinal traces that run in a longitudinal direction of the conductor track, and a plurality of crosspieces that connect the longitudinal traces, wherein the grid structure extends over an entire length of the conductor track, all the way to the connector ends, and wherein a width of the crosspieces between the recesses increases in the direction of the antenna ends.

\* \* \* \* \*